Dec. 9, 1958  J. R. WATKINS  2,863,697
VEHICLE GLARE SHIELD
Filed Jan. 8, 1957

INVENTOR.
James R. Watkins
BY Webb Mackey & Burden
HIS ATTORNEYS

United States Patent Office 2,863,697
Patented Dec. 9, 1958

2,863,697

VEHICLE GLARE SHIELD

James R. Watkins, Lexington, Ky.

Application January 8, 1957, Serial No. 633,071

5 Claims. (Cl. 296—97)

The present application relates to a glare shield device for road vehicles. Preferably this device consists of a shape of tinted plastic strip or other inexpensive medium securable near the inside of the glass windshield for the vehicle at a point in front of the driver so as to protect his eyes from the dazzle of oncoming vehicle headlights at night. The location of the strip in the line of sight of the driver coupled with the precise shape of this strip enables the leading edge thereof to be arranged with one marginal section following the normal highway division line between the driver's lane and the other lane of opposed traffic and with another marginal section following just outside the border of the other lane.

In the use of prior night driving shields of the highway dividing type, the driver notes marked difficulty merely in trying to attain binocular vision in his own lane. This difficulty is due to a normal process in persons with binocularity of the eyes to detect a ghost image for which the technical medical explanation can be found under the heading of physiological diplopia. The physical presence of prior shields attended with the interference of their ghost images with binocular vision is sometimes a serious matter and it is perhaps as important for the driver not to sacrifice his normal two-eyed fusion at night as it is for him to avoid the somewhat blinding effect of the glaring lights of oncoming vehicles, and preferably his range of two-eyed fusion should be extended as far as possible into both lanes for proper safety at night. Otherwise, the drivers possessing normal eyes temporarily impair the sharpness of depth perception that they otherwise possess, whereas others having a clinically significant eye condition known as lateral muscular imbalance (a condition affecting approximately 16% of the driving population) are affected even more so. When the eyes of a driver of this latter category become disassociated by looking at a ghost image, their muscular imbalance manifests itself enough to cause virtual displacement of an oncoming vehicle and the highway ahead from their actual positions in a projected ratio as large as 10 cm. at one meter, making for gross errors in judgment and possibly accidents.

The present invention differs in principle from prior shields in that light tracers are "marginal" rather than "central," furthermore it materially reduces or largely eliminates the foregoing difficulties by providing a highway dividing type of glare shield which masks out oncoming headlight beams and in a way to retain roughly full binocular vision in the driver's lane and in three fourths of the other lane and to the extent of the driver's own headlights in his lane, and in fact, affording clear vision in the other three fourths of the other lane except for a ghost image. Such effectiveness in this glare shield is based in part on the little appreciated fact, first, that oncoming headlight beams when projected onto a windshield cover a relatively small area before each individual eye and invariably have a characteristic trace, but even more importantly, in recognition of the fact, second, that the shield can be shaped to transform the resulting ghost image into generally harmless proportions and to further displace it to a noncritical point materially reducing unwanted effects by certain head movements.

Further features, objects, and advantages will either be specifically pointed out or become apparent when for a better understanding of the invention, reference is made to the following written description taken in conjunction with the accompanying drawing which shows a preferred embodiment and in which.

Figure 1:
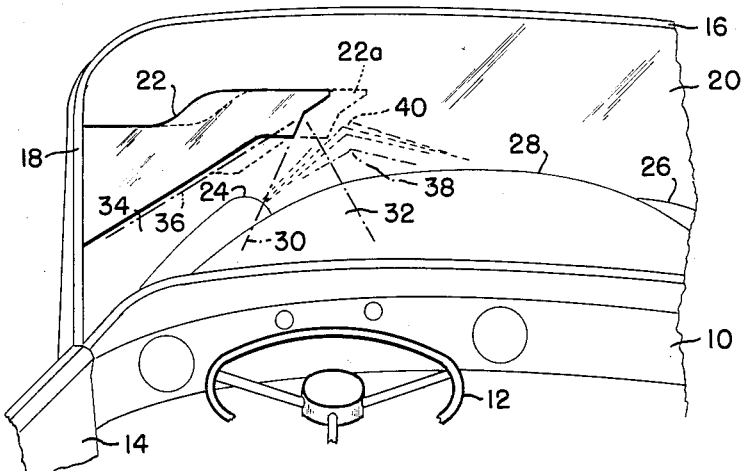
Figure 1 is an inside perspective view from the driver's side of an automotive vehicle embodying the present invention.

In the drawing a passenger automobile provided with the usual left-hand drive is viewed so as to simulate the driver's perspective, whereby a conventional instrument panel 10 and steering wheel 12 are readily perceived at the forward end of the passenger compartment and also a side door 14 hinged as customarily adjacent the driver for his access. A windshield frame 16 having fixed pillars 18 adjacent the vehicle side doors, holds a one-piece curved glass windshield 20 which crosses the passenger compartment at the front and which has generally bow-shaped ends that curve a short distance rearwardly around the front corners of the passenger compartment. A glare shield device 22 according to the present invention consists of a shape of tinted plastic strip or other inexpensive medium securable near the inside of the curvature of the glass windshield at a point generally in front of the eyes of the driver. This device may be permanently secured to the glass by bonding it as a decalcomania thereon or with a transparent cement or laminating it inside the glass, but in one physically constructed embodiment of the invention short lengths of pressure sensitive transparent tape were provided which adhered to the glass surface to tape the device directly thereto. The particular embodiments of the device just noted were constructed by cutting shapes from X-ray film having 10% light transmitting characteristics (i. e., 90% light absorption) although there is a considerable range of satisfactory absorptive media for this purpose such as transparent or tinted sheets of plastic or tinted isinglass, cellophane, Polaroid, or similar strips.

The vehicle has front sheet metal of conventional construction which includes the usual headlight-containing, left and right fenders 24 and 26 and a broad hood 28 transversely therebetween covering the engine compartment, not shown. The highway ahead of the vehicle has the customary highway center division line 30 between the driver's own lane 32 and the next adjoining lane 34 of opposed traffic having the opposite border line 36. A dimmer switch, not shown, is provided for convenience in the passenger compartment for operating the headlamps in the fenders 24, 26 so as to selectively direct a depressed beam therefrom which strikes the highway ahead in the vicinity of indicated area 38 whereas the so-called bright lights strike the highway at the more remote area 40 due to elevating the beam.

Figures 2, 3:
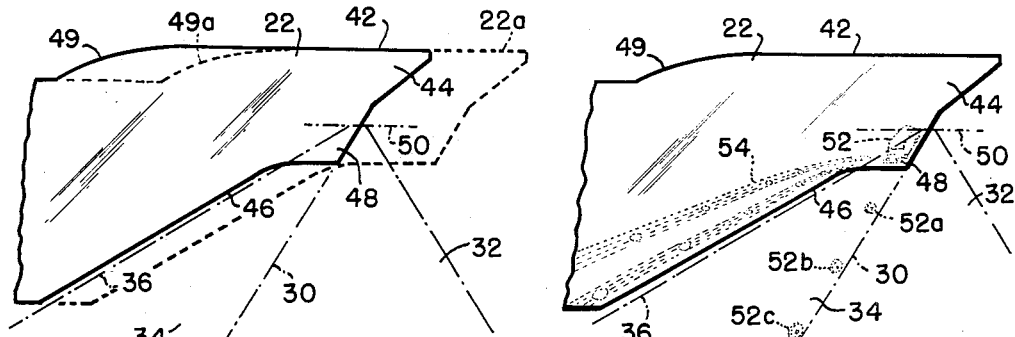
Figure 2 is a developed view of the invention of Figure 1 to enlarged scale with the ghost image shown to that scale.
Figure 3 is a similar view with the showing of the ghost image removed.

In Figures 2 and 3 the shape of the device 22 is the same for all drivers and it includes a top edge 42 which as a first consideration in installing the device for each driver must be made exactly level with the car body. The device 22 has an irregularly cut leading edge and comprises an upper salient portion 44 arranged with a blunt corner at the end thereof, and with the lower adjacent edge forming the initial part of the leading edge. A reentrant angled portion 46 of the leading edge which is offset downwardly and laterally from the portion 44 has a generally rounded corner, and a third or intermediate salient portion 48 of the leading edge extends between the two portions 44 and 46 and forms a reentrant angled juncture with the upper salient portion 44. As a second consideration in aligning the present device 22, which is custom located for the individual driver depending on his height of eye level, the reentrant angled juncture between the portions 44 and 48 must be aligned so as to be slightly above the plane of intersection of the driver's line of sight with the true horizon line indicated at 50. Thus with the driver in his normal position and with his chin and head slightly upraised, the two adjacent salient portions 44 and 48 tend to straddle the true horizon line 50 which intersects the latter about midway on the right-hand edge thereof. As a third consideration in locating the device 22, which is made with the driver's left eye closed, the noted right-hand edge of the salient portions 48 is brought into coincidence with the center of the two lanes of the highway so as to exactly follow the highway division line 30 and form an extension slightly beyond the vanishing point thereof. In this position of the shield device the salient portion 48 and the reentrant angled portion 46 have a generally horizontally extending side in common which at one end makes a sharp corner at the apex of the salient portion 48 and which curves in the opposite direction around the reentrant angled portion 46 to join with the opposite edge of the latter which coincides with the side edge 36 of the opposite lane 34 of the highway so as to follow the road as the vehicle moves along. The upper edge 42 of the device 22 has a down-curving portion 49 having a curving corner complementary to the reentrant angled portion 46.

The present device 22 which is a strip of approximate dimensions 4½" wide x 11" long, extends completely to the edge of the windshield pillar 18 (Figure 1) where it is trimmed off after being custom located for the individual driver, as noted. This location is made with their left eye closed and with a slight left tilt to the head and the chin slightly elevated, but when they open both eyes some people under certain conditions can detect a ghost image 22a which is horizontally displaced (and somewhat raised by the head tilt) in the general rightward direction of Figures 1 and 2 such that the step portion 49a in the top edge 42 likewise shifts to the right to the dotted line position. This ghost image is ignored, suppressed or otherwise not apparent to most people. In any case it is not detrimental to the functioning of the device even to those who are aware of it and the present strip device 22 affords an absolute minimum ghost to those drivers affected. Thus, the driver according to Figure 1 retains full binocular vision to the extent of his bright lights in his own lane 32 and full binocular vision to that same extent in approximately three fourths of the other lane of oncoming traffic, particularly adjacent the division line 30 according to Figure 2. In addition, the driver is afforded clear vision in the other three-fourths of the other lane except for a ghost image shown in the dotted line area in the lane 34 and this is even further eliminated by the head tilt to be almost nonexistent. It will be noted that the ghost image shown by the dotted lines 49a for the stepped portion 49 bears a close consistency of resemblance or uniformity in outline to the solid line showing of the reentrant angled portion 46 on the diagonally arranged leading edge of the device 22.

In use, the device 22 masks out all direct beams from oncoming headlights from both the right and left eyes of the vehicle driver. Figure 3 is simplified to show the effect of oncoming beams viewed solely from the right eye to simplify the presentation. Anyway, the left eye could never be exposed until after the right eye has come within the beam. The headlight beam from a straight oncoming vehicle initially appears generally adjacent the reentrant angled juncture between the salient portions 44 and 48 which occurs roughly at, but slightly above the horizon line when it is down in place with another car about to pass by. On closer approach, the trace of the beam gradually extends along but above the edge of the salient portion 48 to a point at which the oncoming vehicle reaches the dotted line position shown by the dotted line 52 in Figure 3. However, when only one car is approaching, one keeps the lights from the very beginning in the corner of the salient portion 48 until they begin their excursion leftward. This means that during the initial stages of contact the device 22 may be left generally higher than in its final position. At this point which generally occurs at 200 to 250 feet out, test results show that the trace of the headlamp beam begins an uncanny excursion in a left-hand path indicated by the dotted lines 54 and passes rapidly on by during the advancement of the vehicle wheels into the final approaching positions 52a, 52b, and 52c to come alongside the driver's own vehicle. Slight chin movement of the driver makes it easy to keep the trace of the headlight beam under the shield 22, and otherwise the driver's head stays in a normal position with eye level slightly below the salient portion 48 for the usual nighttime driving and all daylight driving. The same shielding effect can be accomplished purely with a head tilting movement but preferably is accomplished with a combination of tilting and chin movement. In this respect the driver, during all of his daylight driving time and generally during his nighttime driving sits with his chin at a normal comfortable level and with his head positioned normally, whereas when he accosts oncoming headlights at night he tilts his head slightly to the left and raises his chin so as to bring his eyes under the shield 22. Thereafter, the oncoming vehicle headlamps inherently linger along their track inside the right edge of the salient portion 48 for a majority of their approach time, seemingly in slow motion, whereupon they are kept on their uncanny excursion to the left during their last brief 200 to 250 feet of closing by appropriate head tilting and chin movement of the driver to maintain the lights generally on the path 54 but undeviatingly above the adjacent edge of the strip.

The mean eye distance contemplated is approximately 26" from shield to driver. The salient portion 44 is utilized for lights of oncoming vehicles dropping over a hill to the right from a distance a mile or so away and also to reach the trace of the lights of vehicles approaching from a curve from the right onto the oncoming lane 34.

The preferable light transmitting capacity of the strip device 22 is from about 1% to about 20% with a preferred transmitting capacity of 3% (97% light absorptive) which is approximately optimum. Young eyes are not bothered as much by oncoming lights and react well behind a shield which has as high as approximately 15% light transmitting characteristics whereas older eyes with low glare resistance, high recovery time, and poor dark adaptation ability naturally require a darker strip, perhaps having as low as 1% transmitting characteristics. In any case, comfortable vision results with a minimum ghost image whereby there is no encroachment of the shield 22 or its ghost image into the driver's own lane 32 to the extent of his high beam headlights, in fact, little difficulty is experienced in the other lane of oncoming traffic 34 from which, as a general rule, the driver subconsciously attempts to divert his eyes anyway.

Figure 4:
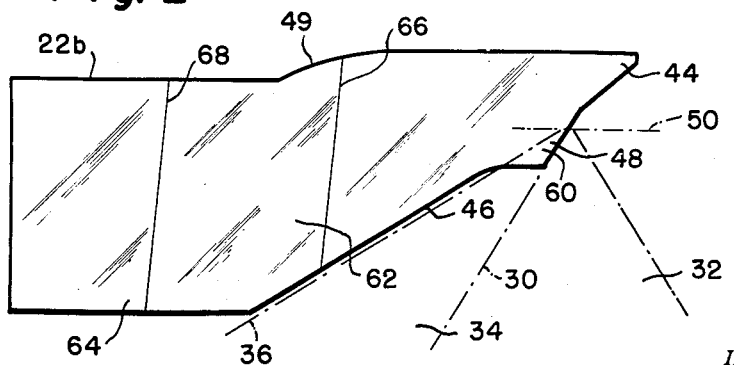
Figure 4 is a modification in the developed view.

In the modified form of device 22b according to Figure 4, I provide portions thereon which are dimmed to a lesser and to a greater extent than a center portion. More specifically, a right end portion indicated at 60 is of uniform density throughout, but is somewhat darkened so as to be dimmer than the center portion 62. On the other hand, the left end portion indicated at 64 is dimmed to a less extent than the midportion 62. A gradient density division 66 which intersects the left edge of the reentrant angled portion 46 extends vertically between and divides the end portion 60 and the area of the center portion 62. A similar line of gradient density indicated at 68 which is offset to the left of the down stepping portion 49 and the left edge of the reentrant angled portion 46, extends vertically between and transversely divides the left end portion 64 from the area of the center portion 62. This less dimmed portion 64 will be particularly effective in detecting pedestrian traffic when used with curved glass windshields having an exaggerated wrap-around effect to the point at which they reach the windshield pillar.

A laminated construction is a cheap way of making the glare shield 22b having the gradient density feature. In such case, the device 22b will be of diminishing thickness from right to left with the right end portion 60 having three thicknesses. The third thickness will be eliminated at the line 66 and, therefore, the middle portion 62 will have two thicknesses. The line 68 will mark the end of the second thickness so that the left end portion 64 will consist solely of the first thickness. The first thickness is considerably darker than the others and when superimposed with the second thickness its opaqueness is somewhat augmented so as to be slightly more densely dimmed. Similarly, when these two thicknesses are further augmented with the third thickness, a more densely dimmed portion results. A uniform gradient density can also be accomplished chemically as well as thru other scientific means.

Following is an example of the effective preferred light absorptive qualities of the portions of the device 22b with gradient density:

Left end portion 64—75% plus or minus 10%
Center portions 62—85% plus or minus 5%
Right end portion 60—95% plus or minus 4%

As herein disclosed the present device is embodied in a left-hand drive vehicle having the strip secured directly to the inner left-hand side of the curved windshield. The device 22 is equally adapted for flat glass windshields and may be simply reversed end for end and secured adjacent the opposite windshield pillar in vehicles within countries where their traffic system is set up for right-hand drive vehicles. It is is evident that a hinged adjustable mounting bracket for the glare shield device can be equally advantageously employed to pivot the device (which can be made out of a more rigid material) completely out of the way during daytime driving. In such case, the mounting bracket is preferably shiftably supported for a 6" to 8" range of adjustment up and down in the vicinity of the windshield or pillar structure to make one device adjustable for the individual use and comfort of several drivers who from time to time use the same vehicle.

Variations within the spirit and scope of the invention described are equally comprehended by the foregoing description.

I claim:

1. A glare shield device for curved front glass in road vehicles comprising a darkened strip of flexible light transmitting material adapted to be secured to the curve of the glass in the vicinity of the driver's line of sight, said strip having a generally diagonally arranged side thereof and having the strip body formed with an upper salient portion of which one edge provides a portion of the margin of said side, a reentrant angled portion located in said diagonal side in a disposition downwardly and laterally offset from the salient portion, and a third portion which extends between the two portions first named and has one edge in common with the reentrant angled portion, said third portion further having a predetermined slanting edge adapted to coincide with the highway division line, the relative offset of the reentrant angled portion being sufficient that a margin thereof having another predetermined slant coincides with the border line of the adjacent lane of oncoming highway traffic.

2. A device according to claim 1 wherein said third portion constitutes a salient portion next to the upper salient portion and forming a reentrant angled juncture therewith, said salient portions just named being arranged to straddle the horizon such that said reentrant angled juncture therebetween is located slightly above the intersection of the true horizon line with a straight extension of the highway division line.

3. An antidazzle device for reducing windshield glare inside a road vehicle comprising a strip of material of reduced light transmitting qualities adapted to be mounted in a vehicle in interposition in the driver's line of sight, said strip having a leading edge extending generally diagonally beneath a main horizontal edge of the body thereof, said body being formed with an upper salient portion having an edge forming part of said leading edge, a reentrant angled portion of said leading edge, downwardly and laterally offset from said salient portion, and another salient portion which extends between the two portions first named and has one margin in common with the reentrant angled portion, said other salient portion having a predetermined slanting margin which coincides with the highway division line, the relative offset of said reentrant angled portion being sufficient that a margin thereof, having another predetermined slant, coincides with the border line of the adjacent lane of on-coming highway traffic, and a stepped portion formed in said main horizontal edge of the strip conforming in outline to said reentrant angled portion but offset upwardly and to one side thereof.

4. An antidazzle device for reducing windshield glare inside a highway vehicle comprising a strip of material with from about 2% to about 25% light transmitting qualities adapted to be mounted in the vehicle in interposition in the driver's line of sight, said strip having a leading edge generally diagonally disposed beneath a main horizontal edge of the body thereof, said body being formed with an upper salient portion adapted to block out the sweep of the headlights of an oncoming vehicle on the crest of a hill or making a turn onto the highway and having an edge forming part of said leading edge, a reentrant angled portion of the leading edge downwardly and laterally offset from said salient portion, and another salient portion which extends between the two portions first named and has one margin in common with the reentrant angled portion, said other salient portion having a predetermined slanting margin which coincides with the highway division line, the relative offset of said reentrant angled portion being sufficient that the margin thereof has another predetermined slant coinciding with the border line of the adjacent lane of on-coming highway traffic, and a stepped portion formed in said main horizontal edge of the strip having a corner conforming in outline to said reentrant angled portion, but being upwardly and laterally offset therefrom, said other salient portion having a sharp corner at the apex.

5. A road vehicle anti-glare visor, comprising a cut-shape of material of reduced light transmitting qualities having a generally horizontally extending body portion, there being a top salient portion of the visor body having an edge forming part of the leading edge of the visor, said leading edge extending generally diagonally to the visor body and having another portion adapted to coincide with the center line of the road, said center line portion and the first said part of the leading edge intersecting one another to form a reentrant angle, and a lower curve in the leading edge of the visor body presenting portions including a horizontal edge portion intersecting the center line portion of the leading edge to form an outwardly pointing angle and a moderately horizontal edge portion adapted to coincide with the curbline.

References Cited in the file of this patent

UNITED STATES PATENTS

| 1,468,750 | Sechrist | Sept. 25, 1923 |
| 1,534,487 | Banks | Apr. 21, 1925 |
| 2,050,889 | Klise | Aug. 11, 1936 |
| 2,239,158 | McCloud | Apr. 22, 1941 |
| 2,528,038 | Crise | Oct. 31, 1950 |

FOREIGN PATENTS

| 440,832 | Italy | Oct. 20, 1948 |